March 11, 1941.    J. S. RIEDMAIER    2,234,607
EMERGENCY BRAKE SIGNAL
Filed Nov. 3, 1939    2 Sheets-Sheet 1
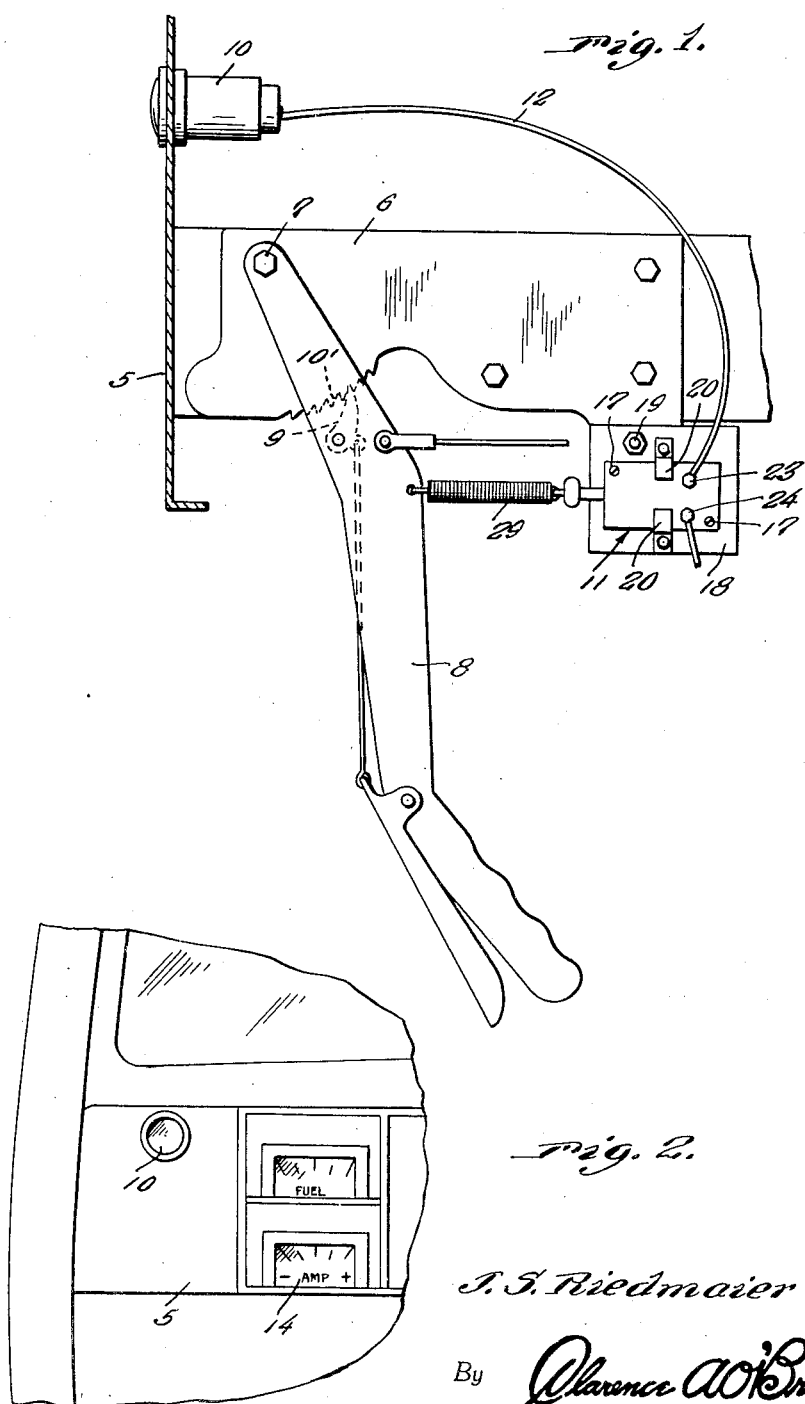
Inventor
J. S. Riedmaier
By Clarence A. O'Brien
and Hyman Berman
Attorneys March 11, 1941. J. S. RIEDMAIER 2,234,607
EMERGENCY BRAKE SIGNAL
Filed Nov. 3, 1939  2 Sheets-Sheet 2
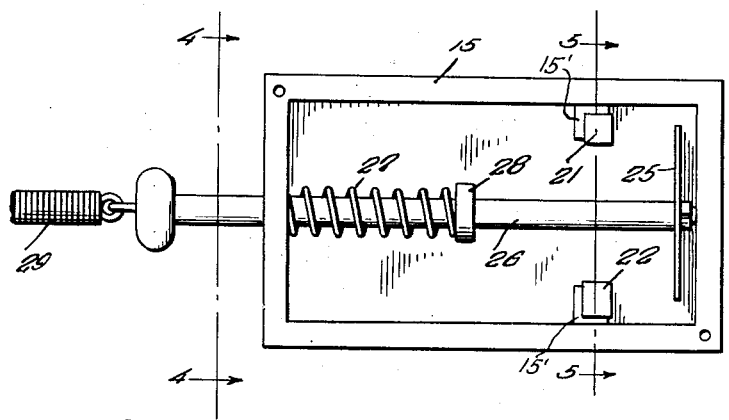
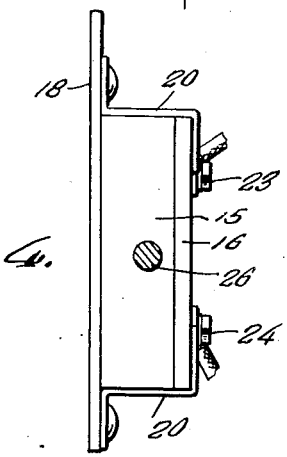
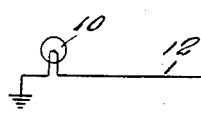

Patented Mar. 11, 1941

2,234,607

UNITED STATES PATENT OFFICE 2,234,607

EMERGENCY BRAKE SIGNAL

John S. Riedmaier, Port Clinton, Ohio

Application November 3, 1939, Serial No. 302,768

1 Claim. (Cl. 200—59)

This invention relates broadly to automobiles and analogous automotive vehicles of the kind equipped with manually-operable emergency brakes and an electrical ignition system; and the invention has particular reference to a signal device for use in connection with the manually-operable emergency brake and the electrical ignition system for giving a warning to the operator of the vehicle to the end that the starting or attempting to start the automobile with the brake applied will be prevented; and the invention together with its objects and advantages will be best understood from a study of the following description taken in connection with the accompanying drawings wherein—

Figure 1 is an elevational view illustrating the application of the invention.

Figure 2 is a fragmentary view of the interior of an automobile showing the signal lamp forming part of the invention mounted on the instrument board.

Figure 3 is an elevational view of the switch forming part of the invention with the cover plate of the switch housing removed.

Figures 4 and 5 are sectional views taken substantially on the lines 4—4 and 5—5, respectively, of Fig. 3, and Figure 6 is a wiring diagram further illustrating the application of the invention.

Referring more in detail to the drawings it will be seen that 5 indicates generally a portion of a conventional instrument board of an automobile while 6 indicates a bracket extending therefrom and to which is pivoted in a well-known manner as at 7 the hand lever 8 forming part of the emergency brake system of an automobile. The lever 8 is provided with the usual detent 9 cooperable with the ratchet 10' for securing the lever 8 at the desired position of adjustment.

In accordance with the present invention there is suitably mounted on the instrument board 5 of the automobile a signal lamp 10 of the "flash" type for flashing a signal to the operator when the ignition switch of the automobile is closed and the emergency brake is in brake-applied, or locked position.

The signal lamp 10 is connected with one side of a switch indicated generally by the reference numeral 11 through the medium of a wire 12, and the other side of the switch 11 is connected with one side of the ignition switch 13 of the automobile through the amperes indicator 14 as will be clear from a study of Figures 1 and 6.

The switch 11 comprises a switch housing 15 of non-conductive material and provided with a removable cover plate 16 secured in position on the housing through the medium of screws or other fastening elements 17.

The housing 15 is mounted on a bracket plate 18 that is secured to the bracket 6 through the medium of a bolt or other fastening element 19 as shown in Figure 1.

For removably securing the switch housing or casing 15 on the bracket plate 18 there are provided upper and lower clips 20 secured to the plate 18 and having end portions engaging the switch housing as clearly shown in Figures 1 and 4.

Mounted in the switch housing 15 are contacts 21 and 22. The wire 12 is electrically connected with the contact 21 through the medium of a terminal bolt 23 while the wire leading from one side of the amperage indicator 14 is electrically connected with the contact 22 through the medium of a terminal bolt 24. As shown in Figures 3 and 5 each of the contacts 21 and 22 is formed of an angle-shaped piece of metal which engages the top wall and a side wall of a lug or projection 15' formed in the casing or housing 15, one projection extending from one side wall of the housing and the other from the opposite side wall thereof and each contact has its front edge extending beyond a projection, as shown in Figure 3. The bolts 23 and 24 are carried by the cover 16 and press against the contacts 21 and 22 as shown in Figure 5. Thus by removing the cover 16 the contacts 21 and 22 are exposed so that they can be readily cleaned as can the inner ends of the bolts so as to insure good electrical connections between the bolts and the contacts.

For engagement with the projecting parts of the contacts 21, 22 there is provided a bridge contact plate 25. The plate 25 is suitably mounted on one end of a rod 26 that slides through an opening provided therefor in one end wall of the switch housing 15, and the bridge contact 25 is normally urged to a position out of engagement with the contacts 21 and 22 through the medium of a coil spring 27. Coil spring 27 is disposed on the rod 26 between a fixed collar 28 on the rod and the aforementioned end wall of the switch casing 15 as shown in Fig. 3.

The outer or free end of the rod 26 is resiliently connected with the hand-brake lever 8 through the medium of a coil spring 29 as shown.

From the foregoing it will be apparent that when the emergency brakes are released the bridge contact 25 will be substantially in the position shown in Fig. 3, and out of engagement with the contacts 21, 22 of switch 11. However, when the switch lever 8 is moved in a direction and to a position applying the emergency brakes rod 26 will move therewith against the action of spring 27 to engage the bridge contact 25 with the contacts 21, 22. It will thus be seen that when the ignition switch 13 is closed and with the emergency brakes in this applied or locked position the circuit through the signal lamp 10 will be completed thus causing this lamp to flash on and off and thereby give a visual signal to the operator that the emergency brakes are in this applied or locked position. Thus in this way is the possibility of the operator starting or attempting to start the vehicle with the emergency brakes applied reduced to a minimum if not entirely prevented.

It is thought that a clear understanding of the construction, utility, advantages and operation of an emergency brake signal for automobiles embodying the features of this invention will be had without a more detailed description.

Having thus described the invention what is claimed as new is:

In a signal device of the class described, a housing having one side open, a cover member removably connected with the open side of the housing, said housing and cover member being formed of non-conducting material, a pair of spaced projections formed with the housing and located at the inner side walls thereof with said projections terminating short of the open end of the housing, an angle-shaped contact strip on each projection with a part of each strip engaging the inner side wall of a projection and another part engaging the top of the projection, the contacts projecting forwardly beyond the projections, bolts carried by the cover and pressing against the last-mentioned parts of the contacts, a bridge member for bridging the contacts by engaging the projecting parts thereof when moved to a certain position, a rod passing through one end of the housing and having its inner end connected with the bridge member, a projection on the rod, a spring on the rod between the projection and that end of the housing through which the rod passes for normally holding the rod in a position with the bridge member out of engagement with the contacts, a lever and a spring connecting the outer end of the rod with the lever for imparting movement to the rod when the lever is moved to cause the bridge member to engage the contacts.

JOHN S. RIEDMAIER.